US012099858B2

(12) United States Patent
Mishra et al.

(10) Patent No.: US 12,099,858 B2
(45) Date of Patent: Sep. 24, 2024

(54) SYSTEMS HAVING COMPONENTS CONFIGURED FOR LAYERED MACHINE LEARNING-BASED OPTIMIZATION OF USER INTERFACE RENDERINGS AND METHODS OF USE THEREOF

(71) Applicant: Capital One Services, LLC, McLean, VA (US)

(72) Inventors: Kalanand Mishra, Mountain View, CA (US); Christopher Vito Covalucci, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/169,771

(22) Filed: Feb. 15, 2023

(65) Prior Publication Data

US 2024/0272917 A1   Aug. 15, 2024

(51) Int. Cl.
*G06F 9/451* (2018.01)
*G06N 20/00* (2019.01)

(52) U.S. Cl.
CPC ............. *G06F 9/451* (2018.02); *G06N 20/00* (2019.01)

(58) Field of Classification Search
CPC ................................. G06F 9/451; G06N 20/00
See application file for complete search history.

(56) References Cited

U.S. PATENT DOCUMENTS

| 10,846,735 | B2 | 11/2020 | Bennion et al. |
| 11,107,115 | B2 | 8/2021 | Singhai et al. |
| 2019/0114661 | A1* | 4/2019 | Bennion ............ G06Q 30/0277 |
| 2019/0139085 | A1* | 5/2019 | Lee ........................ G06Q 50/01 |

* cited by examiner

*Primary Examiner* — Cao H Nguyen
(74) *Attorney, Agent, or Firm* — Greenberg Traurig, LLP

(57) ABSTRACT

Systems and methods of the present disclosure provide dynamic and context sensitive user experience optimization by receiving an interface rendering request from a user device associated with a user and accessing user data of the user. A trained rendering type machine learning model is used to predict a rendering type for displaying a user interface (UI) to the user, based on the user data. A trained rendering template machine learning model is used to predict an interface rendering template for the UI rendering based on the rendering type and the user data. A trained presentation machine learning model is used to predict a presentation item to display in the rendering template based on the rendering type, and the user data. The user device is instructed to render the UI on a display so as to dynamically display a context sensitive UI including the presentation item according to the rendering template.

18 Claims, 6 Drawing Sheets

SYSTEMS HAVING COMPONENTS CONFIGURED FOR LAYERED MACHINE LEARNING-BASED OPTIMIZATION OF USER INTERFACE RENDERINGS AND METHODS OF USE THEREOF

BACKGROUND

Typically, to test interface renderings, different versions of the interface rendering are provided across a population of users. Use data is received for each version and performance is evaluated based on the use data.

BRIEF SUMMARY

In some aspects, the techniques described herein relate to a method including: receiving, by at least one processor, an interface rendering request from a user device associated with a user; determining, by the at least one processor, a user profile associated with the user device, wherein the user profile includes user data representative of user online behavior of the user; utilizing, by the at least one processor, a trained rendering type machine learning model to predict a rendering type from a plurality of candidate rendering types for displaying a user interface rendering to the user, based at least in part on the user data of the user profile; wherein the trained rendering type machine learning model includes at least one trained rendering type classification layer having trained rendering type classification parameters; utilizing, by the at least one processor, a trained rendering template machine learning model to predict an interface rendering template from a plurality of candidate interface rendering templates for the user interface rendering based at least in part on: a library of rendering templates, the rendering type, and the user data of the user profile; wherein the trained rendering template machine learning model includes at least one trained rendering template classification layer having trained rendering template classification parameters; wherein the rendering template is selected from; wherein the rendering template includes at least one presentation container for displaying at least one presentation item; utilizing, by the at least one processor, a trained presentation machine learning model to predict the at least one presentation item from a plurality of candidate presentation items to display in the at least one presentation container of the rendering template based at least in part on: the rendering type, and the user data of the user profile; wherein the trained presentation machine learning model includes at least one trained presentation classification layer having trained presentation classification parameters; generating, by the at least one processor, the user interface rendering in response to the rendering request; wherein the user interface rendering includes the at least one presentation item configured to be positioned within the at least one container of the rendering template; and instructing, by the at least one processor, the user device to render the user interface rendering on a display so as to display the at least one presentation item within the at least one container of the rendering template.

In some aspects, the techniques described herein relate to a method, wherein the rendering request is associated with at least one software user interface (UI).

In some aspects, the techniques described herein relate to a method, wherein the at least one software UI includes at least one of: a webpage rendering, an application rendering, or an operating system (OS) interface.

In some aspects, the techniques described herein relate to a method, wherein the least one software UI includes an interface component within at least one of: a webpage rendering, an application rendering, or an operating system (OS) interface.

In some aspects, the techniques described herein relate to a method, further including: receiving, by the at least one processor, at least one rendering metric indicating at least one measurement of user engagement with the at least one presentation item of the interface rendering; generating, by the at least one processor, exploit training data including: the rendering type, the rendering template, the at least one presentation item, and the at least one rendering metric; training, by the at least one processor, according to the exploit training data, the trained rendering type classification parameters of the rendering type machine learning model to refine the trained rendering type classification layer; training, by the at least one processor, according to the exploit training data, the rendering template classification parameters of the rendering template machine learning model to refine the trained rendering template classification layer; and training, by the at least one processor, according to the explore training data, the presentation classification parameters of the presentation machine learning model to refine the trained presentation classification layer.

In some aspects, the techniques described herein relate to a method, further including: generating, by the at least one processor, a randomly generated interface rendering in response to a prior rendering request; wherein the interface rendering includes: a randomly selected rendering type from the plurality of candidate rendering types, a randomly selected rendering template from the plurality of candidate rendering templates, and at least one randomly selected presentation item from the plurality of candidate presentation items; generating, by the at least one processor, the randomly generated interface rendering in response to the prior rendering request; wherein the randomly generated interface rendering includes the at least one randomly selected presentation item configured to be positioned according to the randomly selected rendering template; and instructing, by the at least one processor, the user device to render the randomly generated interface rendering on the display so as to display the at least one randomly selected presentation item; receiving, by the at least one processor, at least one prior rendering metric indicating at least one measurement of user engagement with the at least one randomly selected presentation item of the randomly generated interface rendering; generating, by the at least one processor, explore training data including: the randomly selected rendering type, the randomly selected rendering template, the at least one randomly selected presentation item, and the at least one rendering metric; training, by the at least one processor, according to the explore training data, rendering type classification parameters of the rendering type machine learning model to obtain the trained rendering type classification layer; training, by the at least one processor, according to the explore training data, rendering template classification parameters of the rendering template machine learning model to obtain the trained rendering template classification layer; and training, by the at least one processor, according to the explore training data, presentation classification parameters of the presentation machine learning model to obtain the trained presentation classification layer.

In some aspects, the techniques described herein relate to a method, wherein the rendering template machine learning model includes at least one multi-armed bandit problem trained to optimize a location within the interface rendering of the at least one presentation container.

In some aspects, the techniques described herein relate to a method, further including utilizing, by the at least one processor, the at least one multi-armed bandit problem to optimize the location within the interface rendering of the at least one presentation container based at least in part on a context of the rendering request.

In some aspects, the techniques described herein relate to a method, wherein the context includes at least one of: at least one prior rendering request, at least one location associated with the rendering request, at least one user data attribute of the user data associated with at least one state of the user profile, at least one rendering characteristic associated with the rendering request, or at least one time of day associated with the rendering request.

In some aspects, the techniques described herein relate to a method, wherein the user data includes a transaction history, and the at least one presentation item includes at least one offer for a financial product associated with a financial entity.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Various detailed embodiments of the present disclosure, taken in conjunction with the accompanying FIGS., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIG. 1 through FIG. 6 illustrate systems and methods of interface generation and rendering. The following embodiments provide technical solutions and technical improvements that overcome technical problems, drawbacks and/or deficiencies in the technical fields involving interface rendering that employs inefficient rendering processes, inefficient rendering customization and/or adjustment and inefficient and inaccurate rendering testing. As explained in more detail, below, technical solutions and technical improvements herein include aspects of improved user interface customization and generation by using a layered modelling paradigm that that efficiently identifies interface types, layout and content based on user behaviors for more efficient and dynamic user interface rendering. Based on such technical features, further technical benefits become available to users and operators of these systems and methods. Moreover, various practical applications of the disclosed technology are also described, which provide further practical benefits to users and operators that are also new and useful improvements in the art.

Figure 1:
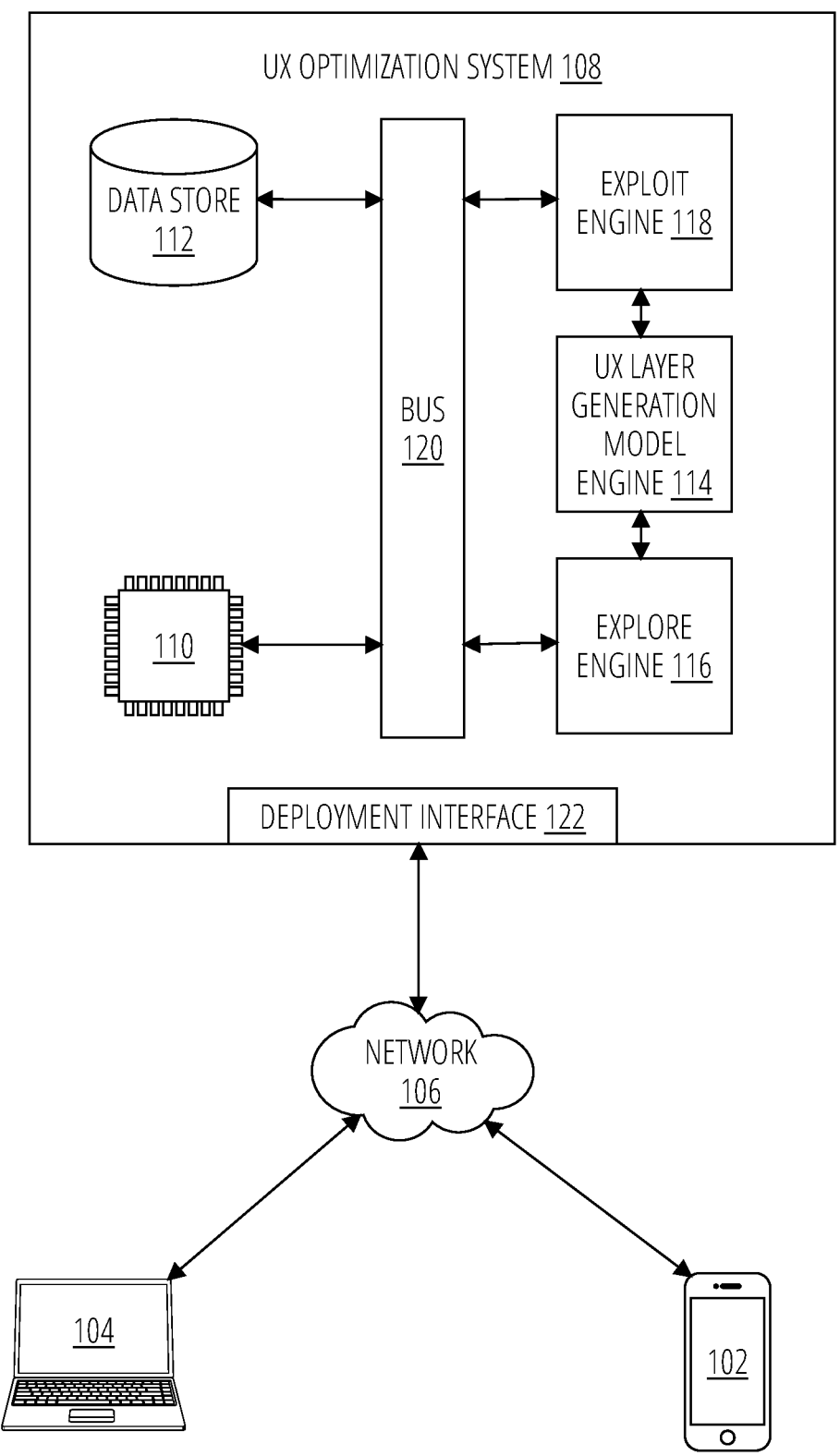
FIG. 1 illustrates a system for user interface optimization employing layered modelling in accordance with one or more embodiments of the present disclosure.

FIG. 1 illustrates a system for user interface optimization employing layered modelling in accordance with one or more embodiments of the present disclosure.

In some embodiments, a user interface (UI) optimization system 108 may be employed to provide dynamic, specialized UI configurations to one or more user devices, such as a Mobile Device 102, a Computer Device 104, or any other suitable device or any combination thereof. The UX Optimization System 108 may include a Processor 110, a Data Store 112, an Exploit Engine 118, an Explore Engine 116, a UX Layer Generation Model Engine 114, a Deployment Interface 122, among other components, that communicate across at least one Bus 120.

In some embodiments, users may interact with a user device such as a Mobile Device 102, a Computer Device 104, or any other suitable device or any combination thereof. The user device may be configured to present a user interface (UI), including, e.g., images, graphics, text, textures, buttons, toggles, text input, among other UI elements or any combination thereof. In some embodiments, the UI may present the UI elements according to a UI configuration that defines the absolute and/or relative location of each UI element and/or the contents of each UI element (e.g., text, image, interactive content, etc.). In some embodiments, the UI may be defined according to, e.g., screen size, device type, input type, content, content type, predefined layouts and/or content, among other factors or any combination thereof. In some embodiments, the term "layout" may refer to a particular UI configuration including a particular combination of elements and/or element types arranged according to a particular combination of locations of each element.

In some embodiments, a user may interact with a user interface via a user device such as, e.g., the Mobile Device 102, the Computer Device 104 or other suitable user device or any combination thereof. In some embodiments, the user interface may include, e.g., an operating system interface, a webpage, a frame/iframe within a webpage, a native application, a frame within a native application, a user interface window, or any other suitable software and/or interface component of software, or any combination thereof.

In some embodiments, the user may click a hyperlink, press a button, or otherwise navigate or interact in such a way as to cause the user device to generate a request for interface content and/or layout data. In some embodiments, such an interaction may trigger a rendering request to the UX Optimization System 108. In some embodiments, the rendering request may include data and/or metadata associated with the rendering request, e.g., a user identifier identifying the user, a device identifier identifying the user device, a screen size associated with the user device, an input device associated with the user device, a device type associated with the user device (e.g., Computer Device 104, Mobile Device 102, wearable, etc.), a time of data associated with the rendering request, a location of the user device at the time of the rendering request, a previous interface rendering from which the user is navigating, a current interface rendering associated with a component of the interface rendering to be produced, among other data and/or metadata associated with the rendering request or any combination thereof.

In some embodiments, the UX Optimization System 108 may be a part of a cloud service and/or server for providing UI data to user devices via a Network 106, which the user device may communicate rendering requests with via a Deployment Interface 122 for requesting and deploying UX configurations. In some embodiments, the user device may issue the rendering request based on, e.g., one or more predefined triggers, such as, e.g., navigation to a new web or application rendering, predetermined time interval, a start or end of playback of a particular media content on the web or application rendering, one or more predefined user interactions and/or selections, or any other suitable trigger or any combination thereof. In some embodiments, the Deployment Interface 122 may issue a request to the user device, where the request triggers the rendering request in reply. Thus, the rendering request may be issued in order to load a new rendering, to dynamically adjust a current rendering, or any other suitable context or any combination thereof.

In some embodiments, the Deployment Interface 122 may include any suitable software and/or hardware interface to facilitate messaging or other suitable communication modality between the UX Optimization System 108 and one or more user devices. In some embodiments, the term "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

For example, in some embodiments, the UX Optimization System 108 may be a component of a content delivery system, a website server, an application server, or other suitable remote computing system or any combination thereof. Thus, the UX Optimization System 108 may be added or integrated into any suitable computer system to generate and serve UI rendering configurations, layouts, content items or other components and elements of a UI or any combination thereof. In some embodiments, the UX Optimization System 108 may be a third-party system that operates alongside, but separately from the cloud service and/or server for providing the UI data to the user devices, such as, e.g., via API integration or other suitable service provisioning technique or any combination thereof. In some embodiments, the UX Optimization System 108 be incorporated locally on the user device as a component of the operation system and/or application rendering the UI. Thus, the components of the UX Optimization System 108 may be implemented locally on the user device. In some embodiments, the UX Optimization System 108 may be implemented in a hybrid scheme, with the components of the UX Optimization System 108 effectuated by a combination of local resources on the user device and/or remote resources accessed via the Network 106.

In some embodiments, the UX Optimization System 108 may interact with the user device to dynamically assemble a user experience. Here, the term user experience (UX) refers to the timing, content, sequencing, layout and other factors that relate to how the UI is delivered to the user. In some embodiments, the UX includes the UI as well as how the UI is delivered to produce an experience to elicit a particular user response or type of response.

In some embodiments, the UX Optimization System 108 may include hardware components such as a Processor 110, which may include local or remote processing components. In some embodiments, the Processor 110 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the Processor 110 may include data-processing capacity provided by the microprocessor. In some embodiments, the microprocessor may include memory, processing, interface resources, controllers, and counters. In some embodiments, the microprocessor may also include one or more programs stored in memory.

Similarly, the UX Optimization System 108 may include Data Store 112, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage 111 may include, e.g., a suitable non-transient computer readable medium such as, e.g., random access memory (RAM), read only memory (ROM), one or more buffers and/or caches, among other memory devices or any combination thereof.

In some embodiments, the UX Optimization System 108 may implement computer engines for dynamic layered optimization of the UX on the user device, including explore and/or exploit paradigms for delivery dynamic UX components and training of one or more machine learning models. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to dynamically optimize the UX, the UX Optimization System 108 may include computer engines including, e.g., a UX Layer Generation Model Engine 114 to dynamically generate personalized UX components and/or variations based on user data and/or context and on user interactions with the UI in real-time, an Exploit Engine 118 to dynamically deliver UX components and/or variations produced by the UX Layer Generation Model Engine 114 in real-time in response to user interactions with the UI, and an Explore Engine 116 to dynamically delivery real-time randomly selected components and/or variations of the UI in response to user interactions. In some embodiments, the UX Layer Generation Model Engine 114, the Explore Engine 116 and/or the Exploit Engine 118 may include dedicated and/or shared software components, hardware components, or a combination thereof. For example, each engine may include a dedicated processor and storage. However, in some embodiments, the UX Layer Generation Model Engine 114, the Explore Engine 116 and/or the Exploit Engine 118 may share hardware resources, including the Processor 110 and Data Store 112 of the UX Optimization System 108 via, e.g., a Bus 120.

In some embodiments, the UX Optimization System 108 may optimize the UX on the user device for the user given a context of the user based on the rendering request and/or user data of a user identified by the rendering request. In some embodiments, the user data may include, e.g., a prior rendering request, a location associated with the rendering request, a state of the user profile, among other user data or any combination thereof. In some embodiments, the state may include, e.g., a balance of a financial account, a balance of crypto-tokens in a user wallet, a current location of the user device, among other states or any suitable combination thereof. In some embodiments, the user data may be stored in the Data Store 112, e.g., stored in a user profile, user records, or other data structure stored in the Data Store 112 according to a database schema configured to store such user data.

In some embodiments, UX Optimization System 108 may employ the user data associated with the rendering request and/or the data and/or metadata associated with the rendering request to generate UX configurations personalized for the user and responsive to a context of the user interactions. In some embodiments, the UX configuration may include, e.g., a rendering type, a rendering template associated with a layout of one or more UI components and/or elements, one or more content or presentation items presented in each UI component/element, a timing of the content/presentation item, an animation, a transition, among other suitable UI structure and/or behavior or any combination thereof. In some embodiments, the term template may refer to any element, combination of elements, content, text, formatting, layout, rendering type/category, or other component part of a UX or any combination thereof. In some embodiments, the term content may refer to any media (e.g., image, video, audio, etc.), text, embedded or attached file (e.g., editable or non-editable documents, including HTML, CSS, Javascript, Microsoft Office file, multimedia file, PDF, XML, text file, Google Workspace file, Apple iWork file, etc.), messaging, hyperlink, social media feed, among other files or any combination thereof.

In some embodiments, to do so, the UX Optimization System 108 may employ the UX Layer Generation Model Engine 114 to leverage the user data and/or rendering request data for intelligent and context sensitive UX configurations that are dynamic and response to user behaviors. In some embodiments, the UX Layer Generation Model Engine 114 may be configured to define one or more layers of the UX in response to the user data and/or rendering request data. In some embodiments, the term "UX layer" refers hierarchical logical groupings of UI/UX configurations having a rendering category or rendering type as a higher layer in the hierarchy and specific items of content for presentation as a lower layer in the hierarchy, with one or more intervening layers in the hierarchy. In some embodiments, the UX may be divided into multiple hierarchical layers of configurations and the UX Layer Generation Model Engine 114 may include a separate machine learning model for each hierarchical layer. As a result, the UX Layer Generation Model Engine 114 may use multi-stage filtering based on each hierarchical layer as a way to solve the problem of prohibitively large numbers of combinations of UX configurations across the layers. Accordingly, the UX Layer Generation Model Engine 114 may present a multi-stage decisioning process to produce a digital optimization system that dynamically assembles UX and content atomically where components of the UX at each layer are interchangeable, allowing for more or less granular control over experience delivery based on level of intelligence needed to maximize value.

For example, the multistage filtering may include the hierarchical UX layers of real-time qualification for base segment to define a rendering type, clustering for a layout of UI containers, dynamic content assembly including selecting items for presentation in each UI container. In particular, the user may be categorized in a group based on the user data, and content selection may be performed via a classification and/or clustering technique suitable for real-time and/or near real-time prediction of container selection. Presentation items may be dynamically selected based on the user data and/or context to populate each container. In some embodiments, dynamic assembly ensures the primary UX is rendered rapidly using low complexity and low latency systems.

In some embodiments, once major rendering elements are assembled, the UX Layer Generation Model Engine 114 may optimize for greatest engagement (e.g., according to click rate, click time, viewing duration, or other suitable engagement metric) and hydrate content. In some embodiments, a single stage experience assembly lacks the ability to marry statistical techniques for improved outcomes. In some embodiments, the classification and/or clustering technique for prediction of container selection may include, e.g., a lightweight clustering technique (e.g., multi-armed bandit (MAB), k-nearest neighbor, etc.), a support vector machine (SVM), or other suitable lightweight machine learning model or any combination thereof. In some embodiments, the rapid response times needed for financial services applications can benefit from the progressive rendering approach by employing the lightweight ML techniques in a hierarchical fashion of the UX Layer Generation Model Engine 114.

In some embodiments, the UX Layer Generation Model Engine 114 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neural network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
 a. define Neural Network architecture/model,
 b. transfer the input data to the exemplary neural network model,
 c. train the exemplary model incrementally,
 d. determine the accuracy for a specific number of timesteps,
 e. apply the exemplary trained model to process the newly-received input data,
 f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, for example, based on the user data, the UX Layer Generation Model Engine 114 may predict a classification and/or category of the user to determine a high level UX rendering type and/or category of content to dynamically assemble UX configurations based on user data. In some embodiments, the UX Layer Generation Model Engine 114 may perform such a classification and/or categorization at each layer in the hierarchy, and for each component/element of the UX to mix and match each aspect of the UX based on the user data and user behaviors.

In some embodiments, the build the UX and UI, the classification and/or category predicted by the UX Layer Generation Model Engine 114 at each hierarchical layer of the UX may correspond to one or more templates in the Data Store 112. Thus, the UX Layer Generation Model Engine 114 may classify the user for a particular template or set of templates at each hierarchical layer, either directly with one or more labels specifying the particular template or set of templates, or indirectly with one or more labels that are then matched to the particular template or set of templates.

In some embodiments, the latter arrangement facilitates a more flexible system where a user may be classified into one or more categories description of a user attribute, such as, e.g., an age, interest, hobby, profession, location, demographic, spending level (e.g., how much and/or how frequent the user spends in general or on one or more types of purchases), activity level (e.g., how frequently and/or how long a user engages in one or more types of activities), an education level, employment status, or other suitable classification or any combination thereof. Each category and/or combination of categories may be associated with template or set of templates in the data store. For example, an administrator may curate templates for rendering layouts, rendering types, presentation/content items, messages, etc. for each category or combination of categories. The templates may thus be updated and/or modified through time without affecting the classification of the user.

In some embodiments, directly classifying a user according to the available templates in the Data Store 112 may more efficiently identify templates and/or content for building the UX by removing processing steps. For example, in some embodiments, the administrator may curate templates for rendering layouts, rendering types, presentation/content items, messages, etc. The templates may be correlated to the user based on user attributes via a trained UX Layer Generation Model Engine 114, thus enabling a single-step prediction of a UX configuration.

In some embodiments, the Deployment Interface 122 may be employed to communicate with the user device to measure the effect of the UX upon a UX configuration being deployed to the user device according to the engagement metric. Thus, the UX Layer Generation Model Engine 114 may receive the engagement metric for training to optimize for engagement. In doing so, the UX Layer Generation Model Engine 114 may, over one or more training iterations, formulate a contribution factor indicative of a relative importance of each element in a dynamic assembly, e.g., in the form of a weighting of each component/element of each layer of the UX. As a result, the UX Layer Generation Model Engine 114 may, over time, learn the relative weights for smaller and smaller subsegments of a population of users within which to categorize/classify the user.

In some embodiments, the presentation/content items may be categorized according to, e.g., promotional program, advertising strategy, media content (e.g., movie, video, music, audio, etc.) among other categorization schemes. In some embodiments, as the engagement metrics are returned by the user device, presentation/content items and/or combinations of presentation/content items may be logged with associated performance in the Data Store 112, where performance is indicated by or otherwise associated with the engagement metrics. The category of presentation/content items may then be compared, e.g., periodically and/or continuously, to identify the top performers.

For example, the UX Optimization System 108 may be associated with a financial institution for the purpose of serving advertisements and/or promotions for financial services. Each financial service may have multiple promotional programs. Thus, a particular financial service may be presented according to variations in UX configurations as determined by the UX Layer Generation Model Engine 114. The overall performance of each promotion for a particular financial service may be logged for cross-comparison to determine a top performer.

In some embodiments, the UX Layer Generation Model Engine 114 may be implemented under one or more different UX generation schemes to optimize accuracy, precision and adaptability. Indeed, the templates available for generating the UX may vary over times, as will user behavior, content items, UX objectives and/or performance targets (e.g., regarding rendering runtime performance, user interaction metrics, etc.), among other characteristics of user and/or UX behavior or any combination thereof. As a result, new elements, templates and/or configurations may be added or removed from the templates in the Data Store 112.

In some embodiments, the new templates may be tested under an explore UX generation scheme by injecting random or preselected UX elements into a UX configuration. In some embodiments, to do so, an Explore Engine 116 may generate a UX configuration from preselected and/or random templates. In some embodiments, to better associate the new templates to a user, the Explore Engine 116 may use the UX Layer Generation Model Engine 114 to generate some or all of a UX configuration for the user, and then replace and/or add one or more templates with a random and/or preselected template to explore new UX configurations. The user interactions with the resulting rendering may then be measured to determine the performance of the random and/or preselected template in the context of other UX templates of the UX configuration that are correlated to the user. The resulting UX configuration may be delivered to the user device via the Deployment Interface 122 to cause the user device to render a rendering according to the UX configuration.

In an example of the Explore Engine 116 in application, one or more new welcome messages for a particular rendering type may be added to the templates in the Data Store 112. The Explore Engine 116 may use the UX Layer Generation Model Engine 114 to generate a UX configuration for the user, and then replace the welcome message provided by the UX Layer Generation Model Engine 114 with a random selection from the one or more new welcome messages. A rendering may then be generated and rendered for the user with UX configuration including the new welcome message. User interactions with the rendering may then be measured and compared against user interactions with pre-existing welcome messages to assess a degree of engagement and/or improvement in engagement of the user with the rendering as a result of the new welcome message.

As a result of the exploit scheme, the UX Layer Generation Model Engine 114 may be updated and trained to add new templates to the learned correlations for the user. Therefore, templates and resulting renderings may be updated through time with new elements, components, types, content, etc. and concurrently updating the training of the UX Layer Generation Model Engine 114 to personalize UX configurations to the user.

In some embodiments, the explore scheme may be used for a subset of rendering requests. In other subsets of rendering requests, an exploit scheme may be employed that exploits existing templates and learned correlations to generate a UX configuration for rendering the rendering. To do so, the Exploit Engine 118 may use the UX Layer Generation Model Engine 114 to generate a UX configuration based on the user and on the existing templates in the Data Store 112. The resulting UX configuration may be delivered to the user device via the Deployment Interface 122 to cause the user device to render a rendering according to the UX configuration.

In some embodiments, the UX Optimization System 108 may selectively instantiate the Explore Engine 116 and Exploit Engine 118 for the rendering request based on any of one or more factors. In some embodiments, the factors may include, e.g., whether new templates have been added to the Data Store 112 since a last rendering request from the user, a predefined proportion of instances of explore to exploit UX generation schemes, a predefined proportion of instances of explore to exploit UX generation schemes for the user, a predefined proportion of instances of explore to exploit UX generation schemes for a given rendering type predicted by the UX Layer Generation Model Engine 114 for the user, a predefined proportion of instances of explore to exploit UX generation schemes for a device type associated with the user device, a predefined proportion of instances of explore to exploit UX generation schemes for a type associated with a new template, a predefined period for using the explore scheme, a predefined period for using the exploit scheme, among other factors or any suitable combination thereof.

In some embodiments, the UX Optimization System 108 may first use the UX Layer Generation Model Engine 114 to generate an initial UX configuration, and then select the Explore Engine 116 to modify the initial UX configuration to explore new templates, or select the Exploit Engine 118 to accept the initial UX configuration. In some embodiments, the UX Optimization System 108 may first select one of the Explore Engine 116 or the Exploit Engine 118, and then the selected one of Explore Engine 116 or the Exploit Engine 118 may use the UX Layer Generation Model Engine 114 to generate a UX configuration according to one of an explore or exploit scheme, respectively. For example, the UX Optimization System 108 may select an explore scheme for the rendering request and instantiate the Explore Engine 116. The Explore Engine 116 may determine the new template to explore for the rendering request and use the UX Layer Generation Model Engine 114 to generate a UX configuration for the remainder of the templates to be used in the rendering request.

In some embodiments, the final UX configuration may be delivered to the user device via the Deployment Interface 122. In some embodiments, the UX configuration may be configured to cause the user device to render a rendering according to the UX configuration, including, e.g., a size, location, arrangement and contents of UI components, a behavior of the rendering (e.g., animations, transitions, interactive features, etc.), among other configuration templates or any combination thereof. For example, the use device may include programming that interprets the UX configuration and renders a rendering according to the UX configuration, or the UX configuration may include software instructions for performing the rendering of the rendering, or any combination thereof.

In some embodiments, the Deployment Interface 122 or other suitable interface between the UX Optimization System 108 and the user device may be employed to track user interaction with the rendering. The user interaction may be measured according to any suitable interaction and/or engagement metrics, e.g., time on rendering, time between scrolling, scrolling speed, time on screen of each template/component/content, click rates, errors, rendering timeouts, time to completed rendering of the rendering, among other user behaviors and/or rendering performance metrics or any combination thereof. Such user interaction may be employed to train the UX Layer Generation Model Engine 114 to optimize template selection and UX configuration generation to optimize user interaction, such as, to increase engagement according to time on rendering, click rates, etc., or to minimize errors, rendering timeouts, time to completed rendering, etc. Accordingly, the UX Layer Generation Model Engine 114 may be continuously updated to better model template selection with the user interaction for the user and/or user device.

Figure 2:
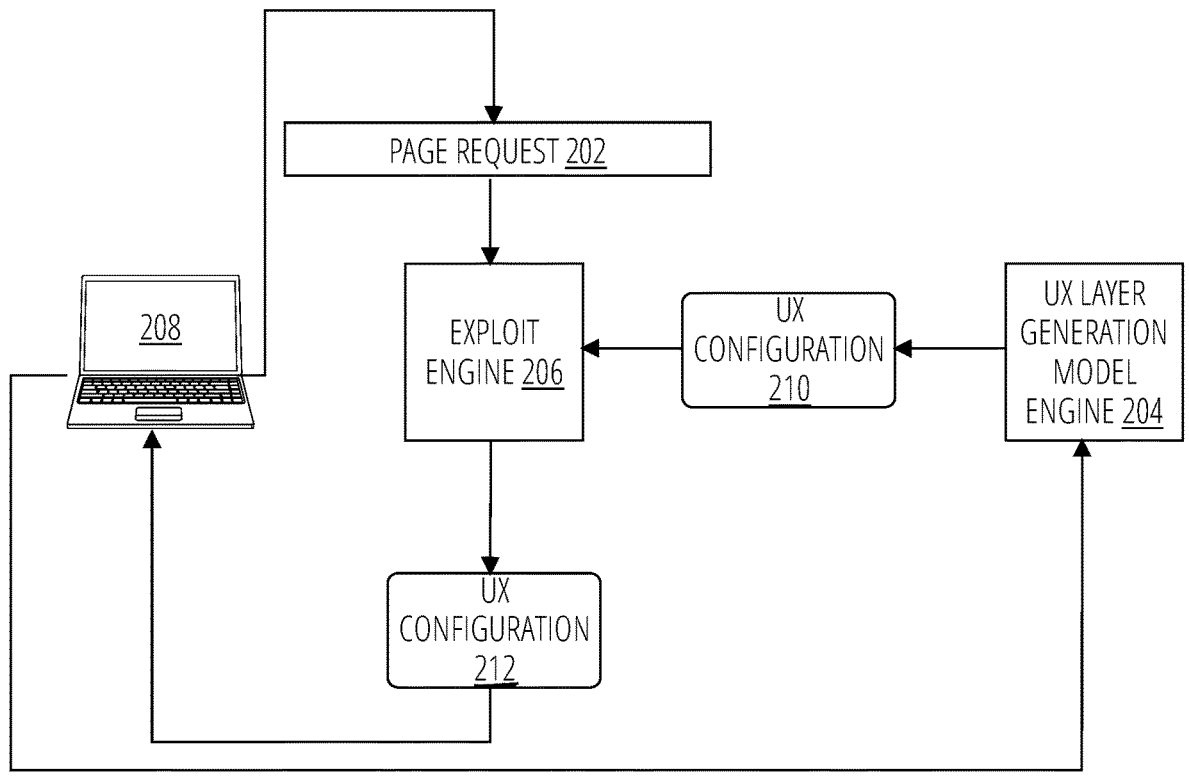
FIG. 2 depicts a user interface (UI) layer generation user experience (UX) Layer Generation Model Engine 204 in an exploit layered machine learning-based UI optimization scheme in accordance with one or more embodiments of the present disclosure.

FIG. 2 depicts a UI layer generation UX Layer Generation Model Engine 204 in an exploit layered machine learning-based UI optimization scheme in accordance with one or more embodiments of the present disclosure.

In some embodiments, the Exploit Engine 206 may be used to generate a UX Configuration 212 and train the UX Layer Generation Model Engine 204 according to user interaction for existing templates in the Data Store 112. Accordingly, the Exploit Engine 206 may receive a rendering request 202 from a User Device 208, e.g., as described above. In some embodiments, the rendering request 202 may specify one or more user attributes, e.g., a user identifier, a device identifier, a device type, one or more user characteristics (e.g., user account type, user account level, demographic, spending category, etc.), a time, a location, among other attributes or any combination thereof.

In some embodiments, the Exploit Engine 206 may use the UX Layer Generation Model Engine 204, e.g., by instantiating the UX Layer Generation Model Engine 204, calling the UX Layer Generation Model Engine 204, or by any other suitable functionality. The Exploit Engine 206 may convey the user attributes to the UX Layer Generation Model Engine 204, which may use the user attributes to model an optimal UX Configuration 210 for the user, the user device, or both to maximize performance, maximize user engagement, minimize errors, etc. Accordingly, based on trained model parameters, the UX Layer Generation Model Engine 204 may generate the UX Configuration 210. In some embodiments, the Exploit Engine 206 may finalize the UX Configuration 210 and output a UX Configuration 212 to the User Device 208, e.g., via the Deployment Interface 122.

In some embodiments, to train the UX Layer Generation Model Engine 204, the UX Layer Generation Model Engine 204 may receive rendering metrics from the User Device 208 that track user interactions and rendering performance of the rendering rendered according to the UX Configuration 212. For example, the rendering metrics may include, e.g., time on rendering, time between scrolling, scrolling speed, time on screen of each template/component/content, click rates, errors, rendering timeouts, time to completed rendering of the rendering, among other user behaviors and/or rendering performance metrics or any combination thereof. In some embodiments, where the rendering displays an offer or promotion or advertisement or combination thereof, the rendering metrics may include, e.g., whether the user took advantage of the offer, promotion and/or advertisement, e.g., as a presentation item of the UX Configuration 212. For example, the rendering may correspond to a financial services entity with one or more offers, rewards, promotions, etc. associated with a financial service. Because the financial services entity may also have access to the user's account activity, such as transactions and services in which the user enrolled, the financial services entity may use whether the user engaged in a transaction or enrolled in a service associated with the offer, promotion and/or advertisement as feedback to the UX Layer Generation Model Engine 204.

In some embodiments, the UX Layer Generation Model Engine 204 may pair the UX Configuration 212 with the rendering metrics to form training data for the exploit scheme ("exploit training data"). In some embodiments, training is performed using an optimizer. In some embodiments, the optimizer may employ a loss function, such as, e.g., Hinge Loss, Multi-class SVM Loss, Cross Entropy Loss, Negative Log Likelihood, or other suitable classification loss function. The loss function determines an error based on the rendering metrics and the UX Configuration 212. In some embodiments, the optimizer may, e.g., back-propagate the error to the UX Layer Generation Model Engine 204 to update the parameters using, e.g., gradient descent, heuristic, convergence or other optimization techniques and combinations thereof. In some embodiments, the optimizer may therefore train the parameters of the UX Layer Generation Model Engine 204 to model a correlation between a configuration of a UX and user behaviors and/or rendering behaviors in order to optimize the rendering.

In some embodiments, as described above, a UX configuration may be defined by hierarchical levels of specificity over the layout, arrangement and content of a rendering. For example, the hierarchical levels in order of increasing specificity may include, e.g., a rendering type, templates for a rendering type (e.g., size and/or arrangement of UI components), behavior of a template (e.g., animations, transitions, etc.), content of each UI component of a template, format and/or style of the content (e.g., fonts, shading, color, patterns, overlays, etc.), and more. In some embodiments, the UX Layer Generation Model Engine 204 may include a separate model for each hierarchical level to form a layered approach to generating the UX Configuration 210. Accordingly, the training data including the rendering metrics may be used to train each model layer (e.g., each model associated with each hierarchical level of the UX Configuration 210). Thus, parameters for classifying rendering type may be trained based on the exploit training data, parameters for classifying a template may be trained based on the exploit training data, parameters for classifying content/presentation items for display in the template may be trained based on the exploit training data, and so on for each layer of models.

In some embodiments, each layer of the UX Layer Generation Model Engine 204 may include one or more suitable classifier machine learning models, such as, e.g., a convolutional neural network (CNN), a Naive Bayes classifier, decision trees, random forest, support vector machine (SVM), K-Nearest Neighbors, or any other suitable algorithm for a classification model.

Figure 3:
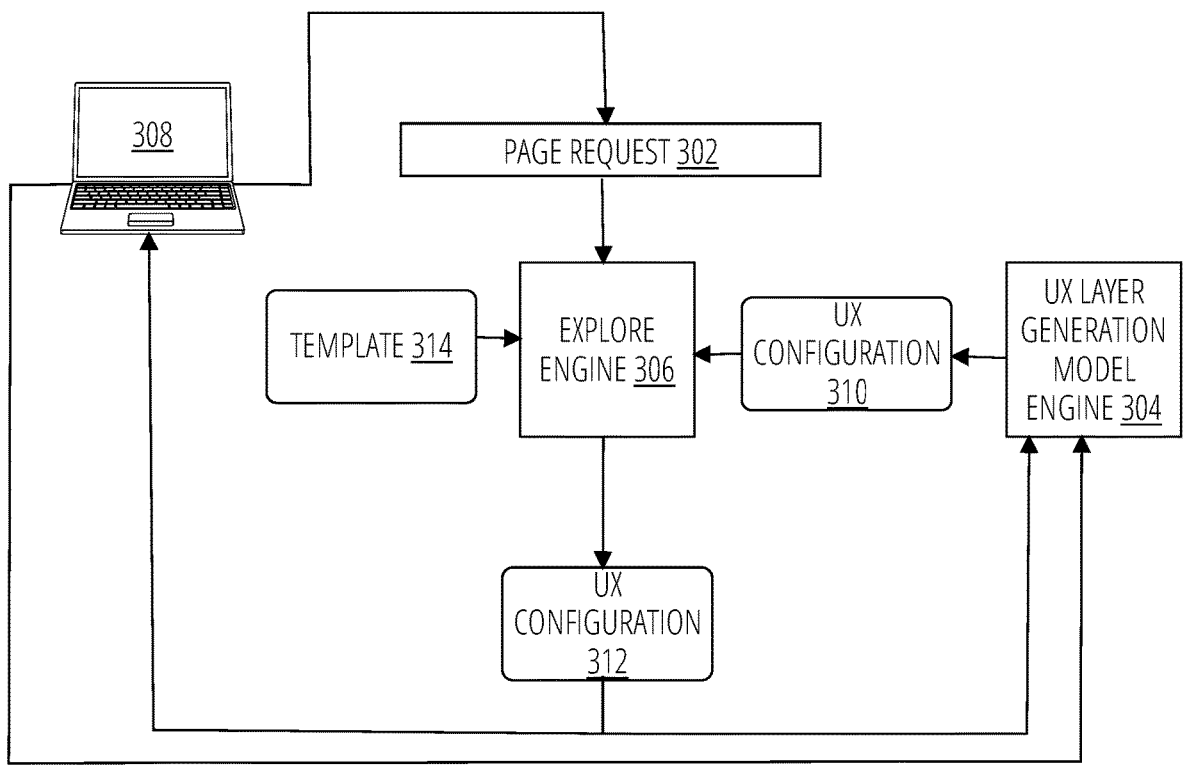
FIG. 3 depicts a UI layer generation UX Layer Generation Model Engine 304 in an explore layered machine learning-based UI optimization scheme in accordance with one or more embodiments of the present disclosure.

FIG. 3 depicts a UI layer generation UX Layer Generation Model Engine 304 in an explore layered machine learning-based UI optimization scheme in accordance with one or more embodiments of the present disclosure.

In some embodiments, the Explore Engine 306 may be used to generate a UX Configuration 312 and train the UX Layer Generation Model Engine 304 according to user interaction for a combination of new and existing templates in the Data Store 112. Here, the term "new" may refer to a template or other UX component for which training of the UX Layer Generation Model Engine 304 has not yet been performed. Accordingly, the Explore Engine 306 may receive a rendering request 302 from a User Device 308, e.g., as described above. In some embodiments, the rendering request 302 may specify one or more user attributes, e.g., a user identifier, a device identifier, a device type, one or more user characteristics (e.g., user account type, user account level, demographic, spending category, etc.), a time, a location, among other attributes or any combination thereof.

In some embodiments, the Explore Engine 306 may use the UX Layer Generation Model Engine 304, e.g., by instantiating the UX Layer Generation Model Engine 304, calling the UX Layer Generation Model Engine 304, or by any other suitable functionality. The Explore Engine 306 may convey the user attributes to the UX Layer Generation Model Engine 304, which may use the user attributes to model an optimal UX Configuration 310 for the user, the user device, or both to maximize performance, maximize user engagement, minimize errors, etc. Accordingly, based on trained model parameters, the UX Layer Generation Model Engine 304 may generate the UX Configuration 310. In some embodiments, the Explore Engine 306 may augment the UX Configuration 310 to insert a Template 314. In some embodiments, the Template 314 may include a pre-determined and/or randomly determined template, such as a newly added template for which training of the UX Layer Generation Model Engine 304 has not yet been performed. Accordingly, the Explore Engine 306 may replace or otherwise insert the Template 314 into the UX Configuration 310 to produce the UX Configuration 312. The Explore Engine 306 may then output the UX Configuration 312 to the User Device 308, e.g., via the Deployment Interface 122.

In some embodiments, to train the UX Layer Generation Model Engine 304, the UX Layer Generation Model Engine 304 may receive rendering metrics from the User Device 308 that track user interactions and rendering performance of the rendering rendered according to the UX Configuration 312. For example, the rendering metrics may include, e.g., time on rendering, time between scrolling, scrolling speed, time on screen of each template/component/content, click rates, errors, rendering timeouts, time to completed rendering of the rendering, among other user behaviors and/or rendering performance metrics or any combination thereof. In some embodiments, where the rendering displays an offer or promotion or advertisement or combination thereof, the rendering metrics may include, e.g., whether the user took advantage of the offer, promotion and/or advertisement, e.g., as a presentation item of the UX Configuration 312. For example, the rendering may correspond to a financial services entity with one or more offers, rewards, promotions, etc. associated with a financial service. Because the financial services entity may also have access to the user's account activity, such as transactions and services in which the user enrolled, the financial services entity may use whether the user engaged in a transaction or enrolled in a service associated with the offer, promotion and/or advertisement as feedback to the UX Layer Generation Model Engine 304.

In some embodiments, the UX Layer Generation Model Engine 304 may pair the UX Configuration 312 with the rendering metrics to form training data for the explore scheme ("explore training data"). In some embodiments, training is performed using an optimizer. In some embodiments, the optimizer may employ a loss function, such as, e.g., Hinge Loss, Multi-class SVM Loss, Cross Entropy Loss, Negative Log Likelihood, or other suitable classification loss function. The loss function determines an error based on the rendering metrics and the UX Configuration 312. In some embodiments, the optimizer may, e.g., backpropagate the error to the UX Layer Generation Model Engine 304 to update the parameters using, e.g., gradient descent, heuristic, convergence or other optimization techniques and combinations thereof. In some embodiments, the optimizer may therefore train the parameters of the UX Layer Generation Model Engine 304 to model a correlation between a configuration of a UX and user behaviors and/or rendering behaviors in order to optimize the rendering.

In some embodiments, as described above, a UX configuration may be defined by hierarchical levels of specificity over the layout, arrangement and content of a rendering. For example, the hierarchical levels in order of increasing specificity may include, e.g., a rendering type, templates for a rendering type (e.g., size and/or arrangement of UI components), behavior of a template (e.g., animations, transitions, etc.), content of each UI component of a template, format and/or style of the content (e.g., fonts, shading, color, patterns, overlays, etc.), and more. In some embodiments, the UX Layer Generation Model Engine 304 may include a separate model for each hierarchical level to form a layered approach to generating the UX Configuration 312. Accordingly, the training data including the rendering metrics may be used to train each model layer (e.g., each model associated with each hierarchical level of the UX Configuration 312). Thus, parameters for classifying rendering type may be trained based on the explore training data, parameters for classifying a template may be trained based on the explore training data, parameters for classifying content/presentation items for display in the template may be trained based on the explore training data, and so on for each layer of models in order to train the UX Layer Generation Model Engine 304 with new templates for producing UX configurations.

In some embodiments, each layer of the UX Layer Generation Model Engine 304 may include one or more suitable classifier machine learning models, such as, e.g., a convolutional neural network (CNN), a Naive Bayes classifier, decision trees, random forest, support vector machine (SVM), K-Nearest Neighbors, or any other suitable algorithm for a classification model.

Figure 4:
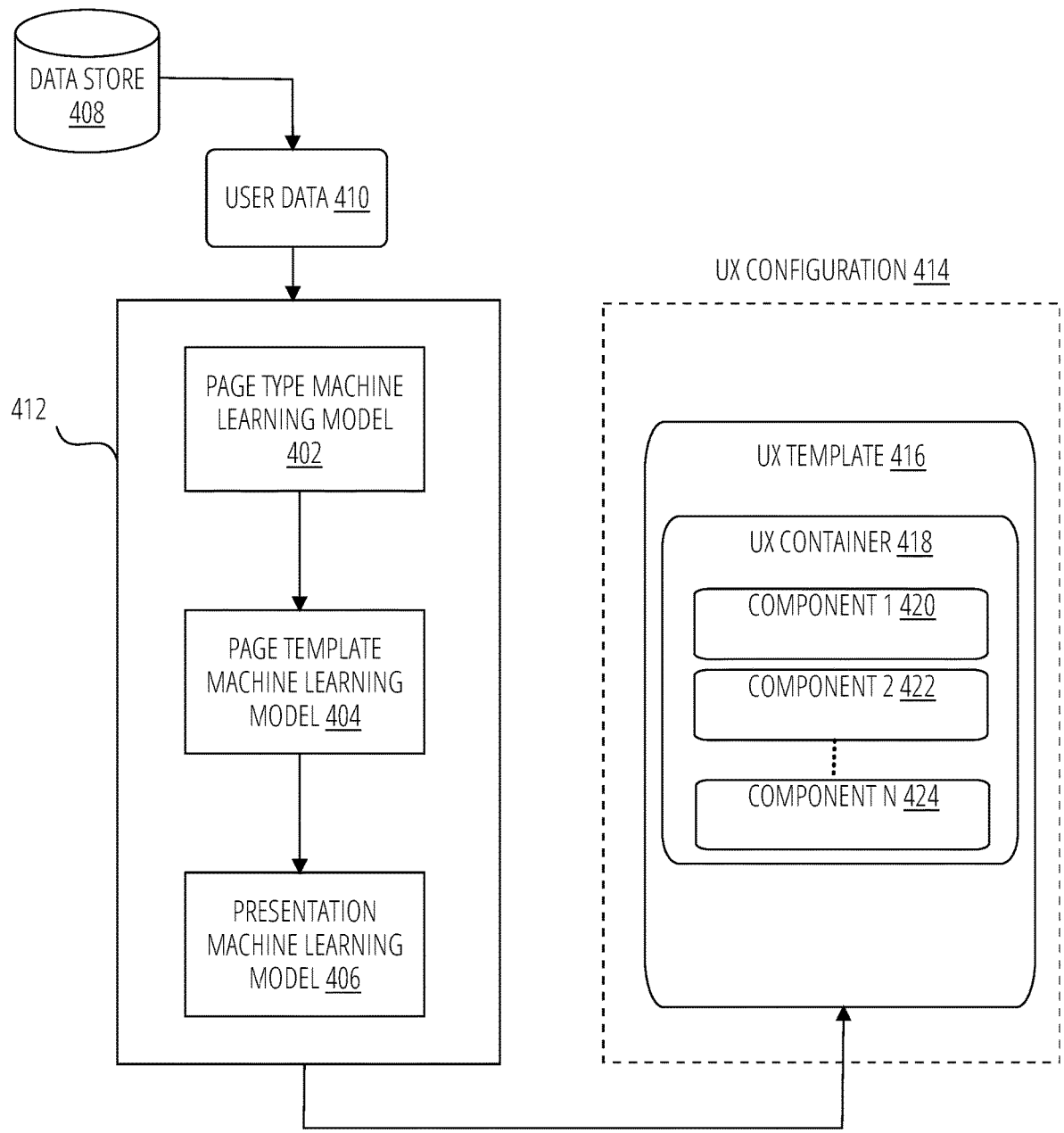
FIG. 4 illustrates an embodiments of a UX Layer Generation Model Engine 412 with three layers of machine learning models for layered machine learning-based UI optimization in accordance with one or more embodiments of the present disclosure.

FIG. 4 illustrates an embodiments of a UX Layer Generation Model Engine 412 with three layers of machine learning models for layered machine learning-based UI optimization in accordance with one or more embodiments of the present disclosure.

In some embodiments, optimizing a UX may be improved by optimizing each logical level or layer of the UX, e.g., at hierarchical levels of specificity over the layout, arrangement and content of a rendering. For example, the hierarchical levels in order of increasing specificity may include, e.g., a rendering type, templates for a rendering type (e.g., size and/or arrangement of UI components), behavior of a template (e.g., animations, transitions, etc.), content of each UI component of a template, format and/or style of the content (e.g., fonts, shading, color, patterns, overlays, etc.), and more. In some embodiments, the UX Layer Generation Model Engine 412 may include a separate model for each hierarchical level to form a layered approach to generating the UX Configuration 414.

In some embodiments, the UX layers may include, e.g., a rendering type layer, a rendering template layer, and a presentation layer. In some embodiments, the rendering type layer may include a definition of a rendering type, such as, e.g., a category or content type, or other categorical definition associated with the UX or any combination thereof. In some embodiments, the rendering template layer may include one or more definitions for a size, shape and relative location of one or more UI components (e.g., one or more frames, cards, buttons, panels, text fields, etc.). In some embodiments, the presentation layer may include definitions associated with one or more presentation items to be rendered in each UI component of the rendering template, such as, e.g., a media selection, file selection, document selection, image selection, user input element selection, interactive multimedia selection, text content selection, among other suitable presentation items or any combination thereof.

In some embodiments, using machine learning at multiple different layers enables the UX Optimization System 108 to optimize the UX at each layer in response to user-related data, such as, e.g., user data from a user profile, historical user behaviors, historical user activities, user interaction metrics, current user interactions and/or user interaction metrics, a UI rendering the user is navigating from, time, date, location, other UX content and/or configurations on the rendering, among other attributes of user-related data or any combination thereof. Thus, the UX Optimization System 108 personalizes the UX for the user based on the context of the user and the UX. Accordingly, in some embodiments, the UX Layer Generation Model Engine 412 may include a Rendering Type Machine Learning Model 402 to dynamically predict a rendering type from a set a rendering types based on user-related data, a Rendering Template Machine Learning Model 404 to dynamically predict a rendering template based on the rendering type and the user-related data, and a Presentation Machine Learning Model 406 to dynamically predict one or more presentation items for rendering within the rendering template based on the rendering type, the rendering template and the user-related data.

In some embodiments, the UX Layer Generation Model Engine 412 may be triggered when a rendering request and/or a content request is received from the user device. In some embodiments, a content request can include an attempt on an existing rendering to load content, e.g., within an iframe, window, or other component of an existing rendering, and/or an explicit request from content. In some embodiments, the UX Layer Generation Model Engine 412 may access User Data 410 in a Data Store 408 to generate an optimized, personalized UX Configuration 414 based on outputs from each of the Rendering Type Machine Learning Model 402, the Rendering Template Machine Learning Model 404 and the Presentation Machine Learning Model 406.

In some embodiments, the Rendering Type Machine Learning Model 402 ingests the User Data 410. In some embodiments, the User Data 410 may include, e.g., data related to a user profile and/or data related to the rendering request/content request from the user device, and/or data related to the user device. Accordingly, in some embodiments, the User Data 410 may include, e.g., user data from a user profile, historical user behaviors, historical user activities, user interaction metrics, current user interactions and/or user interaction metrics, a UI rendering the user is navigating from, time, date, location, other UX content and/or configurations on the rendering, among other attributes of user-related data or any combination thereof.

In some embodiments, the User Data 410 may be ingested by the Rendering Type Machine Learning Model 402. In some embodiments, the Rendering Type Machine Learning Model 402 may include one or more machine learning models for mapping the User Data 410 to a rendering type from a library of rendering types (e.g., stored in the Data Store 408). Accordingly, the Rendering Type Machine Learning Model 402 may employ one or more classifier layers having parameters trained to correlate user data to rendering type. Thus, based on the trained parameters (e.g., node weights in a neural network, regression parameters, number of trees in a random forest, tree depth in a random forest/decision trees, or other machine learning model parameters or any combination thereof), the classifier layers of the Rendering Type Machine Learning Model 402 may predict a particular rendering type for the User Data 410. As a result, the rendering type is responsive to user characteristics and/or context.

In some embodiments, the rendering type may define one or more rendering attributes associated with a particular categorization. For example, the rendering type may be a rendering type configured for a particular set of interactive UI elements, a particular type of media and/or content, or any other suitable set of capabilities and functionalities. Alternatively, or in addition, the rendering type may refer to a particular subset of rendering templates and/or presentation items, such as those associated with a particular time, subject, demographic, user qualification, marketing campaign, or other suitable subset or any combination thereof. As a result, based on the rendering type, an application and/or webpage shell may be loaded with configuration specifications for UX containers.

For example, the rendering type may define a particular subset of financial services promotions of a financial institution for which the user is qualified based on the User Data 410, including, e.g., based on financial transactions, credit balance, savings balance, spending history, etc.

In some embodiments, the Rendering Type Machine Learning Model 402 may employ one or more suitable classifier models for predicting the rendering type based on the User Data 410. For example, the Rendering Type Machine Learning Model 402 may include one or more of, e.g., a convolutional neural network (CNN), a Naive Bayes classifier, decision trees, random forest, support vector machine (SVM), clustering (e.g., K-Nearest Neighbors among others), or any other suitable algorithm for a classification model, or any combination thereof.

Therefore, in some embodiments, there may be a subset of rendering templates applicable to the rendering type identified by the Rendering Type Machine Learning Model 402. In some embodiments, the Rendering Template Machine Learning Model 404 may include one or more machine learning models for mapping the User Data 410 to a rendering template from a library of rendering templates (e.g., stored in the Data Store 408) based on the rendering type in order to select a best performer or likely best performer UI component within the UX containers. The best performer may be measured by, e.g., user engagement metrics such as on-rendering duration, click rate, time-to-click, multimedia playback duration, among other user interaction metrics or any combination thereof. To do so, the Rendering Template Machine Learning Model 404 may employ one or more classifier layers having parameters trained to correlate user data to a UX Template 416. Thus, based on the trained parameters, the classifier layers of the Rendering Template Machine Learning Model 404 may predict a particular UX Template 416 for the User Data 410 and rendering type. As a result, the rendering template is responsive to user characteristics and/or context.

In some embodiments, the output of the Rendering Template Machine Learning Model 404 may include a selection of a UX Template 416 including predefined layout of one or more UX Containers 418. A UX Container 418 may include one or more components (e.g., Component 1 420, Component 2 422 through Component N 424), each component presenting a respective presentation item. Thus, the UX Container 418 may provide the basic UX of the rendering. Alternatively, or in addition, the Rendering Template Machine Learning Model 404 may select each UX Container 418 and/or each Component 1 420, Component 2 422 through Component N 424 to form the UX Template 416.

In some embodiments, the Rendering Template Machine Learning Model 404 may employ one or more suitable classifier models for generating the UX Template 416 based on the User Data 410 and rendering type. For example, the Rendering Template Machine Learning Model 404 may include one or more of, e.g., a convolutional neural network (CNN), a Naive Bayes classifier, decision trees, random forest, support vector machine (SVM), clustering (e.g., K-Nearest Neighbors among others), or any other suitable algorithm for a classification model, or any combination thereof.

In some embodiments, the UX Template 416 may be selected from a library of UX Templates 416. To improve real-time, context sensitive optimization of the UX Template 416, the Rendering Template Machine Learning Model 404 may employ a multi-armed bandit (MAB) model that selects in real-time the best UX template for this user and which components to render based on personalized contextual awareness. Thus, the Rendering Template Machine Learning Model 404 may include the MAB trained to optimize the arrangement of Component 1 420, Component 2 422 through Component N 424 by selecting an optimum UX Template 416 from amongst the library of UX Templates 416. For example, each of Component 1 420, Component 2 422 through Component N 424 may be associated with, e.g., a header, an image, an offer, a call to action, a video, a text body, among other item types or any suitable combination thereof.

In some embodiments, context may be characterized by, e.g., the User Data 410, including, e.g., a prior rendering request, a location associated with the rendering request, a user data attribute of the user data associated with at least one state of the user profile, a rendering characteristic associated with the rendering request, or a time of day associated with the rendering request, among other data or any combination thereof.

In some embodiments, upon defining the layout of the UX via the UX Template 416, the UX Layer Generation Model Engine 412 may employ a Presentation Machine Learning Model 406 to select content and hydrate the UX Configuration 414. The Presentation Machine Learning Model 406 may ingest the UX Template 416 and the rendering type as well as User Data 410 to recommend content/present items for each Component 1 420, Component 2 422 through Component N 424.

In some embodiments, the Presentation Machine Learning Model 406 may include one or more machine learning models configured for content recommendation. In some embodiments, the Data Store 408 may house a catalog of content associated with the rendering type, and the Presentation Machine Learning Model 406 may select content to build out each UX Container 418 of the UX Template 416. For example, the content in the catalog may be filtered with a qualification engine against the UX Container 418. The UX Container 418 may define a content type (e.g., file type, media type, subject, etc.). The Presentation Machine Learning Model 406 may select from the qualifying content individual content items/presentation items to populate each of Component 1 420, Component 2 422 through Component N 424 based on a value-based ranking based on the User Data 410. The content recommendation may include, e.g., natural language processing (NLP) for similarity measures between each content item and the User Data 410, collaborative filtering between each content item and the User Data 410, one or more graph models for the User Data 410 and/or the catalog of content items, or any other suitable recommendation engine for content-based recommendation or any combination thereof.

In some embodiments, the content item associated with each of Component 1 420, Component 2 422 through Component N 424 may be different portion of the UX Container 418. For example, as described above, each of Component 1 420, Component 2 422 through Component N 424 may be associated with, e.g., a header, an image, an offer, a call to action, a video, a text body, among other item types or any suitable combination thereof. Thus, the recommendation engine may select for each of Component 1 420, Component 2 422 through Component N 424 based on the content type of each of Component 1 420, Component 2 422 through Component N 424 and the content-based content recommendation. In some embodiments, each of Component 1 420, Component 2 422 through Component N 424 may include compatibility configurations/rules that define how content may be combined within one or more of Component 1 420, Component 2 422 through Component N 424. For example, a compatibility configuration/rule may include, e.g., acceptable combination of images with text colors, font size, degree of match between text and image contents, among other suitable compatibility configurations/rules or any combination thereof.

In some embodiments, upon content recommendation, the UX Layer Generation Model Engine 412 may output the UX Configuration 414 for the user device based on the User Data 410. The UX Configuration 414 may then be injected into the application and/or webpage being rendered on the user device. In some embodiments, the UX Layer Generation Model Engine 412 may generate and provide the UX Container 418 in response to, e.g., a rendering load instruction when the application and/or webpage attempts to load a new rendering, a user interaction with the application and/or webpage (e.g., scroll to a particular portion of the rendering, a click on a link, a selection of a UI element, etc.), a completion of a playback of audio-visual media, an elapsing of a predefined period of time, or any other suitable trigger that triggers a request for content to be displayed on the rendering or a portion of the rendering. As a result, the UX Layer Generation Model Engine 412 may be employed for dynamic and context-sensitive content serving to the user device for improved rendering and content recommendation under exploit and/or explore paradigms of rendering testing and optimization.

Figure 5:
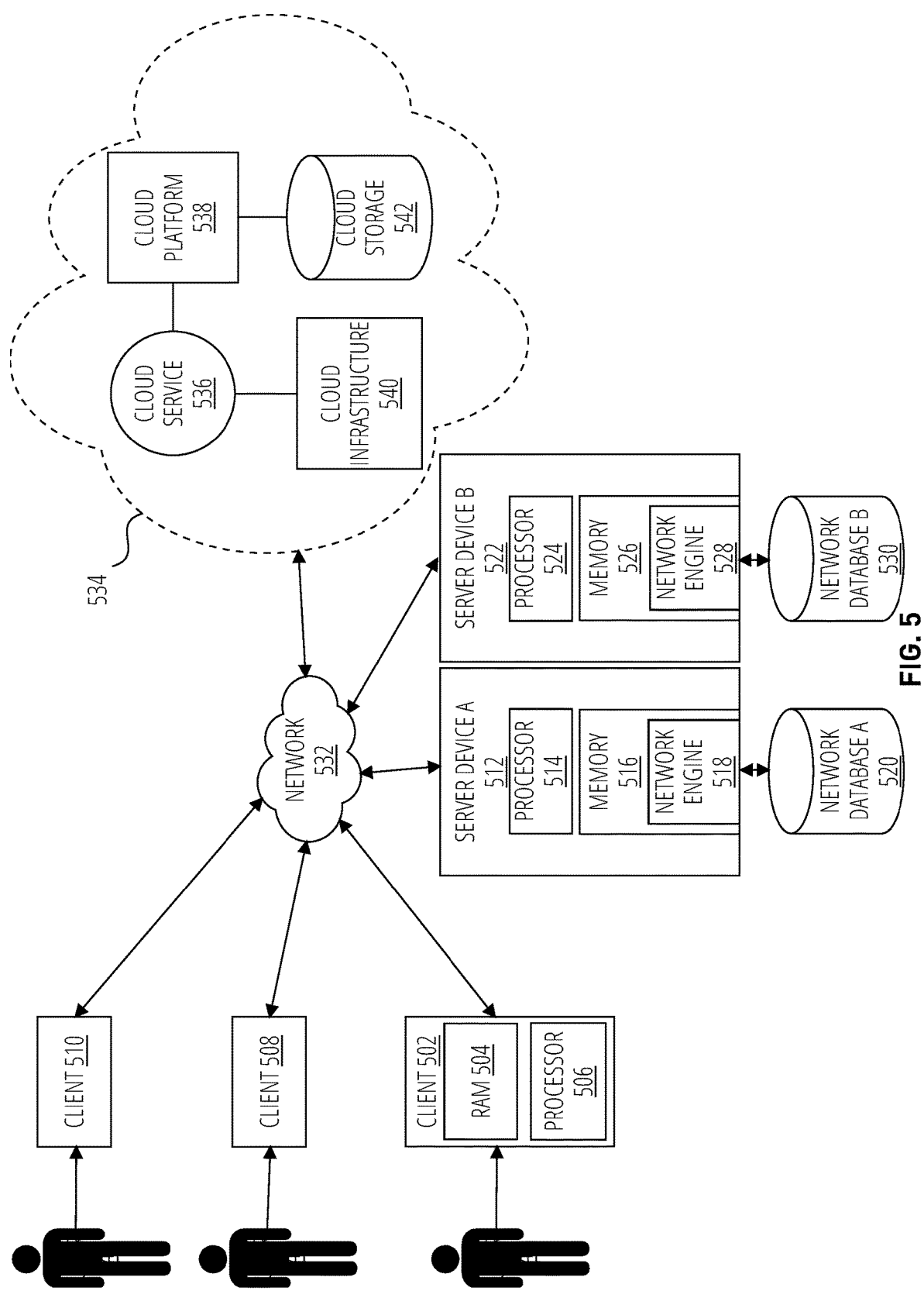
FIG. 5 depicts a block diagram of another exemplary computer-based system and platform for layered machine learning-based UI optimization in accordance with one or more embodiments of the present disclosure.

FIG. 5 depicts a block diagram of another exemplary computer-based system and platform for layered machine learning-based UI optimization in accordance with one or more embodiments of the present disclosure.

FIG. 5 depicts a block diagram of another exemplary computer-based system and platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client devices 502, 508, through 510 shown each at least includes a computer-readable medium, such as a random-access memory (RAM) 504 coupled to a processor 506 and/or FLASH memory. In some embodiments, the processor 506 may execute computer-executable program instructions stored in RAM 504. In some embodiments, the processor 506 may include a microprocessor, an ASIC, and/or a state machine. In some embodiments, the processor 506 may include, or may be in communication with, media, for example computer-readable media, which stores instructions that, when executed by the processor 506, may cause the processor 506 to perform one or more steps described herein. In some embodiments, examples of computer-readable media may include, but are not limited to, an electronic, optical, magnetic, or other storage or transmission device capable of providing a processor, such as the processor 506 of client device 502, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 502, 508, through 510 may also comprise a number of external or internal devices such as a mouse, a CD-ROM, DVD, a physical or virtual keyboard, a display, or other input or output devices. In some embodiments, examples of client devices 502, 508, through 510 (e.g., clients) may be any type of processor-based platforms that are connected to a network 532 such as, without limitation, personal computers, digital assistants, personal digital assistants, smart phones, digital tablets, laptop computers, Internet appliances, and other processor-based devices. In some embodiments, client devices 502, 508, through 510 may be specifically programmed with one or more application programs in accordance with one or more principles/methodologies detailed herein. In some embodiments, client devices 502, 508, through 510 may operate on any operating system capable of supporting a browser or browser-enabled application, such as Microsoft™, Windows™, and/or Linux. In some embodiments, client devices 502, 508, through 510 shown may include, for example, personal computers executing a browser application program such as Microsoft Corpora-tion's Internet Explorer™, Apple Computer, Inc.'s Safari™, Mozilla Firefox, and/or Opera.

In some embodiments, through the member computing client devices 502, 508, through 510, user 544, user 546 through user 548, may communicate over the Network 532 with each other and/or with other systems and/or devices coupled to the network 532. As shown in FIG. 5, exemplary server device A 512 and server device B 522 may include processor 514 and processor 524, respectively, as well as Memory 516 and Memory 526, respectively. In some embodiments, the server devices 512 and 522 may be also coupled to the Network 532. In some embodiments, one or more client devices 502, 508, through 510 may be mobile clients.

In some embodiments, at least one database of exemplary Network Database A 520 and Network Database B 530 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
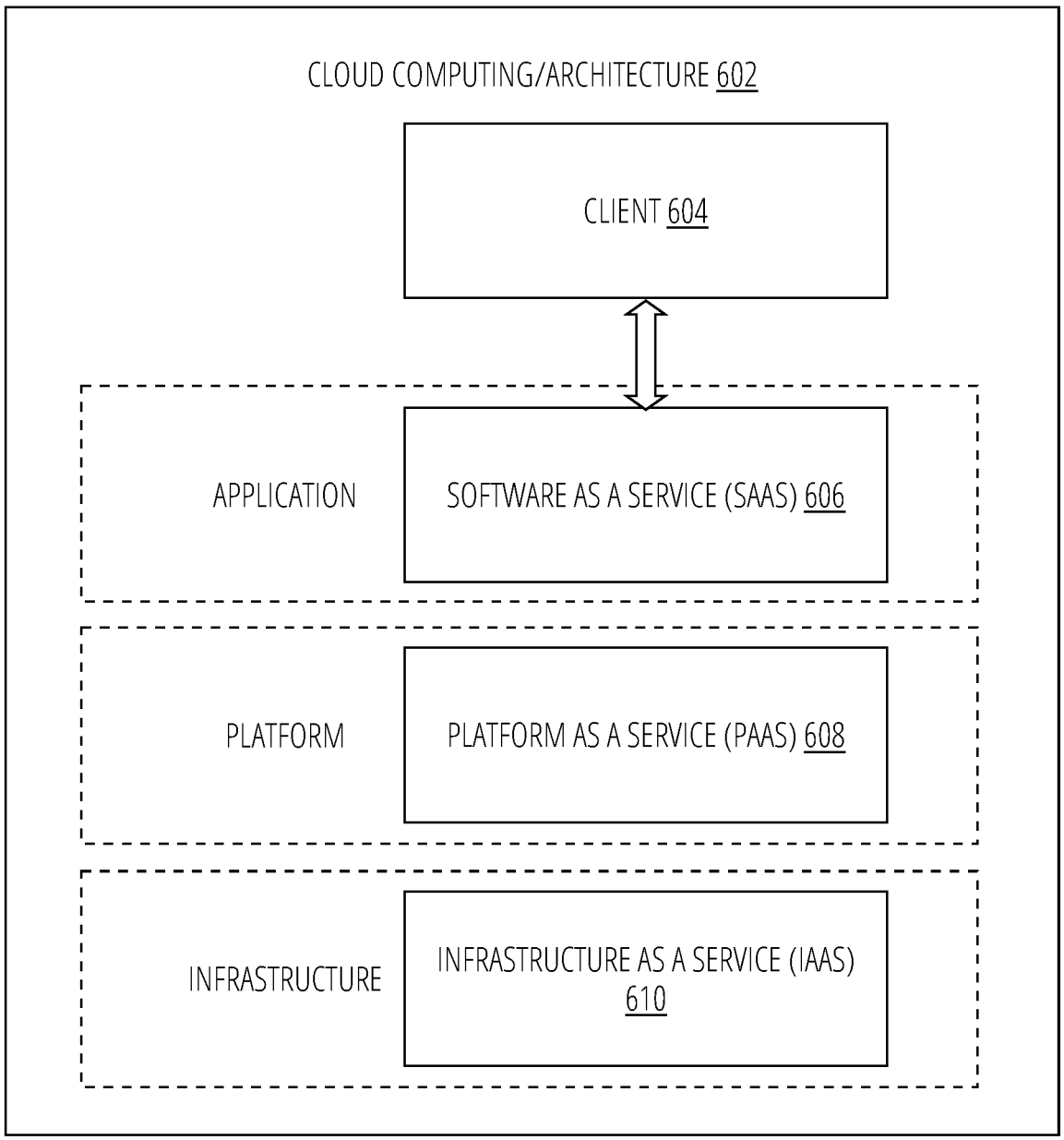
FIG. 6 depicts illustrative schematics of an exemplary implementation of the cloud computing/architecture(s) in which embodiments of a system for layered machine learning-based UI optimization may be specifically configured to operate in accordance with some embodiments of the present disclosure.

FIG. 6 depicts illustrative schematics of an exemplary implementation of the cloud computing/architecture(s) in which embodiments of a system for layered machine learning-based UI optimization may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a Cloud Computing/Architecture 602. The Cloud Computing/Architecture 602 may include one or more layers for infrastructure, a platform, an application, or other layers or any combination thereof. In some embodiments, the Cloud Computing/Architecture 602 may include an infrastructure layer such as, but not limited to Infrastructure as a Service (IaaS) 610 including but not limited, e.g., Virtual Machines, Servers, Storage, Load Balancers, Network, among others or any combination thereof. In some embodiments, the Cloud Computing/Architecture 602 may include a platform layer such as, but not limited to Platform as a Service (PaaS) 608 including but not limited, e.g., Execution Runtime, Database, Web Server, Development Tools, among others or any combination thereof. In some embodiments, the Cloud Computing/Architecture 602 may include an application layer such as, but not limited to Software as a Service (Saas) 606 including but not limited, e.g., CRM, Email, Virtual Desktop, Communication, Games, among others or any combination thereof. In some embodiments, the Cloud Computing/Architecture 602 may include a front-end layer such as, but not limited to a Client 604 or other endpoint for using the Cloud Computing/Architecture 602, including but not limited, e.g., Web Browser, Mobile App, Thin Client, Terminal Emulator, among other endpoints or any combination thereof.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, hand-held computer, palmtop computer, personal digital assistant (PDA), cellular telephone, combination cellular telephone/ PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

1. A method including:
  receiving, by at least one processor, an interface rendering request from a user device associated with a user;
    determining, by the at least one processor, a user profile associated with the user device, where the user profile includes user data representative of user online behavior of the user;
    utilizing, by the at least one processor, a trained rendering type machine learning model to predict a rendering type from a plurality of candidate rendering types for displaying a user interface rendering to the user, based at least in part on the user data of the user profile;
      where the trained rendering type machine learning model includes at least one trained rendering type classification layer having trained rendering type classification parameters;
    utilizing, by the at least one processor, a trained rendering template machine learning model to predict an interface rendering template from a plurality of candidate interface rendering templates for the user interface rendering based at least in part on:
      a library of rendering templates,
      the rendering type, and
      the user data of the user profile;
      where the trained rendering template machine learning model includes at least one trained rendering template classification layer having trained rendering template classification parameters;
      where the rendering template is selected from;
      where the rendering template includes at least one presentation container for displaying at least one presentation item;
    utilizing, by the at least one processor, a trained presentation machine learning model to predict the at least one presentation item from a plurality of candidate presentation items to display in the at least one presentation container of the rendering template based at least in part on:
      the rendering type, and
      the user data of the user profile;
      where the trained presentation machine learning model includes at least one trained presentation classification layer having trained presentation classification parameters:
    generating, by the at least one processor, the user interface rendering in response to the rendering request;
      where the user interface rendering includes the at least one presentation item configured to be positioned within the at least one container of the rendering template; and
    instructing, by the at least one processor, the user device to render the user interface rendering on a display so as to display the at least one presentation item within the at least one container of the rendering template.

2. The method of clause 1, where the rendering request is associated with at least one software user interface (UI).

3. The method of clause 2, where the at least one software UI includes at least one of:
  a webpage rendering,
  an application rendering, or
  an operating system (OS) interface.

4. The method of clause 2, where the least one software UI includes an interface component within at least one of:
  a webpage rendering,
  an application rendering, or
  an operating system (OS) interface.

5. The method of clause 1, further including:
  receiving, by the at least one processor, at least one rendering metric indicating at least one measurement of user engagement with the at least one presentation item of the interface rendering;
  generating, by the at least one processor, exploit training data including:
    the rendering type,
    the rendering template,
    the at least one presentation item, and
    the at least one rendering metric;
  training, by the at least one processor, according to the exploit training data, the trained rendering type classification parameters of the rendering type machine learning model to refine the trained rendering type classification layer;
  training, by the at least one processor, according to the exploit training data, the rendering template classification parameters of the rendering template machine learning model to refine the trained rendering template classification layer; and
  training, by the at least one processor, according to the explore training data, the presentation classification parameters of the presentation machine learning model to refine the trained presentation classification layer.

6. The method of clause 1, further including:
   generating, by the at least one processor, a randomly generated interface rendering in response to a prior rendering request;
   where the interface rendering includes:
      a randomly selected rendering type from the plurality of candidate rendering types,
      a randomly selected rendering template from the plurality of candidate rendering templates, and
      at least one randomly selected presentation item from the plurality of candidate presentation items;
   generating, by the at least one processor, the randomly generated interface rendering in response to the prior rendering request;
      where the randomly generated interface rendering includes the at least one randomly selected presentation item configured to be positioned according to the randomly selected rendering template; and
   instructing, by the at least one processor, the user device to render the randomly generated interface rendering on the display so as to display the at least one randomly selected presentation item;
   receiving, by the at least one processor, at least one prior rendering metric indicating at least one measurement of user engagement with the at least one randomly selected presentation item of the randomly generated interface rendering;
   generating, by the at least one processor, explore training data including:
      the randomly selected rendering type,
      the randomly selected rendering template,
      the at least one randomly selected presentation item, and
      the at least one prior rendering metric;
   training, by the at least one processor, according to the explore training data, rendering type classification parameters of the rendering type machine learning model to obtain the trained rendering type classification layer;
   training, by the at least one processor, according to the explore training data, rendering template classification parameters of the rendering template machine learning model to obtain the trained rendering template classification layer; and
   training, by the at least one processor, according to the explore training data, presentation classification parameters of the presentation machine learning model to obtain the trained presentation classification layer.

7. The method of clause 1, where the rendering template machine learning model includes at least one multi-armed bandit problem trained to optimize a location within the interface rendering of the at least one presentation container.

8. The method of clause 7, further including utilizing, by the at least one processor, the at least one multi-armed bandit problem to optimize the location within the interface rendering of the at least one presentation container based at least in part on a context of the rendering request.

9. The method of clause 8, where the context includes at least one of:
   at least one prior rendering request,
   at least one location associated with the rendering request,
   at least one user data attribute of the user data associated with at least one state of the user profile,
   at least one rendering characteristic associated with the rendering request, or
   at least one time of day associated with the rendering request.

10. The method of clause 1, where the user data includes a transaction history, and the at least one presentation item includes at least one offer for a financial product associated with a financial entity.

11. A system including:
   at least one processor in communication with at least one non-transitory computer readable medium having software instructions stored thereon, where the at least one processor, upon executing the software instructions, is configured to:
      receive an interface rendering request from a user device associated with a user;
      determine a user profile associated with the user device, where the user profile includes user data representative of user online behavior of the user;
      utilize a trained rendering type machine learning model to predict a rendering type from a plurality of candidate rendering types for displaying a user interface rendering to the user, based at least in part on the user data of the user profile;
         where the trained rendering type machine learning model includes at least one trained rendering type classification layer having trained rendering type classification parameters;
      utilize a trained rendering template machine learning model to predict an interface rendering template from a plurality of candidate interface rendering templates for the user interface rendering based at least in part on:
         a library of rendering templates,
         the rendering type, and
         the user data of the user profile;
         where the trained rendering template machine learning model includes at least one trained rendering template classification layer having trained rendering template classification parameters;
         where the rendering template is selected from;
         where the rendering template includes at least one presentation container for displaying at least one presentation item;
      utilize a trained presentation machine learning model to predict the at least one presentation item from a plurality of candidate presentation items to display in the at least one presentation container of the rendering template based at least in part on:
         the rendering type, and
         the user data of the user profile;
         where the trained presentation machine learning model includes at least one trained presentation classification layer having trained presentation classification parameters:
      generate the user interface rendering in response to the rendering request;
         where the user interface rendering includes the at least one presentation item configured to be positioned within the at least one container of the rendering template; and
      instruct the user device to render the user interface rendering on a display so as to display the at least one presentation item within the at least one container of the rendering template.

12. The system of clause 11, where the rendering request is associated with at least one software user interface (UI).

13. The system of clause 12, where the at least one software UI includes at least one of:

a webpage rendering,
an application rendering, or
an operating system (OS) interface.

14. The system of clause 12, where the least one software UI includes an interface component within at least one of:
a webpage rendering,
an application rendering, or
an operating system (OS) interface.

15. The system of clause 11, where the at least one processor, upon executing the software instructions, is further configured to:
receive at least one rendering metric indicating at least one measurement of user engagement with the at least one presentation item of the interface rendering;
generate exploit training data including:
the rendering type,
the rendering template,
the at least one presentation item, and
the at least one rendering metric;
train according to the exploit training data, the trained rendering type classification parameters of the rendering type machine learning model to refine the trained rendering type classification layer;
train according to the exploit training data, the rendering template classification parameters of the rendering template machine learning model to refine the trained rendering template classification layer; and
train according to the explore training data, the presentation classification parameters of the presentation machine learning model to refine the trained presentation classification layer.

16. The system of clause 11, where the at least one processor, upon executing the software instructions, is further configured to:
generate a randomly generated interface rendering in response to a prior rendering request;
where the interface rendering includes:
a randomly selected rendering type from the plurality of candidate rendering types,
a randomly selected rendering template from the plurality of candidate rendering templates, and
at least one randomly selected presentation item from the plurality of candidate presentation items;
generate the randomly generated interface rendering in response to the prior rendering request;
where the randomly generated interface rendering includes the at least one randomly selected presentation item configured to be positioned according to the randomly selected rendering template; and
instruct the user device to render the randomly generated interface rendering on the display so as to display the at least one randomly selected presentation item;
receive at least one prior rendering metric indicating at least one measurement of user engagement with the at least one randomly selected presentation item of the randomly generated interface rendering;
generate explore training data including:
the randomly selected rendering type,
the randomly selected rendering template,
the at least one randomly selected presentation item, and
the at least one prior rendering metric;
train according to the explore training data, rendering type classification parameters of the rendering type machine learning model to obtain the trained rendering type classification layer;
train according to the explore training data, rendering template classification parameters of the rendering template machine learning model to obtain the trained rendering template classification layer; and
train according to the explore training data, presentation classification parameters of the presentation machine learning model to obtain the trained presentation classification layer.

17. The system of clause 11, where the rendering template machine learning model includes at least one multi-armed bandit problem trained to optimize a location within the interface rendering of the at least one presentation container.

18. The system of clause 17, where the at least one processor, upon executing the software instructions, is further configured to utilize the at least one multi-armed bandit problem to optimize the location within the interface rendering of the at least one presentation container based at least in part on a context of the rendering request.

19. The system of clause 18, where the context includes at least one of:
at least one prior rendering request,
at least one location associated with the rendering request,
at least one user data attribute of the user data associated with at least one state of the user profile,
at least one rendering characteristic associated with the rendering request, or
at least one time of day associated with the rendering request.

20. The system of clause 11, where the user data includes a transaction history, and the at least one presentation item includes at least one offer for a financial product associated with a financial entity.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
receiving, by at least one processor, an interface rendering request from a user device associated with a user;
determining, by the at least one processor, a user profile associated with the user device, wherein the user profile comprises user data representative of user online behavior of the user;
utilizing, by the at least one processor, a trained rendering type machine learning model to predict a rendering type from a plurality of candidate rendering types for displaying a user interface rendering to the user, based at least in part on the user data of the user profile;
wherein the trained rendering type machine learning model comprises at least one trained rendering type classification layer having trained rendering type classification parameters;
utilizing, by the at least one processor, a trained rendering template machine learning model to predict an interface rendering template from a plurality of candidate interface rendering templates for the user interface rendering based at least in part on:

a library of rendering templates,
the rendering type, and
the user data of the user profile;
   wherein the trained rendering template machine learning model comprises at least one trained rendering template classification layer having trained rendering template classification parameters;
   wherein the rendering template comprises at least one presentation container for displaying at least one presentation item;
   wherein the trained rendering template machine learning model comprises at least one multi-armed bandit problem trained to optimize at least one location within the interface rendering of the at least one presentation container;
utilizing, by the at least one processor, a trained presentation machine learning model to predict the at least one presentation item from a plurality of candidate presentation items to display in the at least one presentation container of the rendering template based at least in part on:
   the rendering type, and
   the user data of the user profile;
   wherein the trained presentation machine learning model comprises at least one trained presentation classification layer having trained presentation classification parameters:
generating, by the at least one processor, the user interface rendering in response to the rendering request;
   wherein the user interface rendering comprises the at least one presentation item configured to be positioned within the at least one container of the rendering template; and
instructing, by the at least one processor, the user device to render the user interface rendering on a display so as to display the at least one presentation item within the at least one container of the rendering template.

2. The method of claim 1, wherein the rendering request is associated with at least one software user interface (UI).

3. The method of claim 2, wherein the at least one software UI comprises at least one of:
   a webpage rendering,
   an application rendering, or
   an operating system (OS) interface.

4. The method of claim 2, wherein the least one software UI comprises an interface component within at least one of:
   a webpage rendering,
   an application rendering, or
   an operating system (OS) interface.

5. The method of claim 1, further comprising:
receiving, by the at least one processor, at least one rendering metric indicating at least one measurement of user engagement with the at least one presentation item of the interface rendering;
generating, by the at least one processor, exploit training data comprising:
   the rendering type,
   the rendering template,
   the at least one presentation item, and
   the at least one rendering metric;
training, by the at least one processor, according to the exploit training data, the trained rendering type classification parameters of the rendering type machine learning model to refine the trained rendering type classification layer;
training, by the at least one processor, according to the exploit training data, the rendering template classification parameters of the rendering template machine learning model to refine the trained rendering template classification layer; and
training, by the at least one processor, according to the exploit training data, the presentation classification parameters of the presentation machine learning model to refine the trained presentation classification layer.

6. The method of claim 1, further comprising:
generating, by the at least one processor, a randomly generated interface rendering in response to a prior rendering request;
wherein the interface rendering comprises:
   a randomly selected rendering type from the plurality of candidate rendering types,
   a randomly selected rendering template from the plurality of candidate rendering templates, and
   at least one randomly selected presentation item from the plurality of candidate presentation items;
generating, by the at least one processor, the randomly generated interface rendering in response to the prior rendering request;
   wherein the randomly generated interface rendering comprises the at least one randomly selected presentation item configured to be positioned according to the randomly selected rendering template; and
instructing, by the at least one processor, the user device to render the randomly generated interface rendering on the display so as to display the at least one randomly selected presentation item;
receiving, by the at least one processor, at least one prior rendering metric indicating at least one measurement of user engagement with the at least one randomly selected presentation item of the randomly generated interface rendering;
generating, by the at least one processor, explore training data comprising:
   the randomly selected rendering type,
   the randomly selected rendering template,
   the at least one randomly selected presentation item, and
   the at least one prior rendering metric;
training, by the at least one processor, according to the explore training data, rendering type classification parameters of the rendering type machine learning model to obtain the trained rendering type classification layer;
training, by the at least one processor, according to the explore training data, rendering template classification parameters of the rendering template machine learning model to obtain the trained rendering template classification layer; and
training, by the at least one processor, according to the explore training data, presentation classification parameters of the presentation machine learning model to obtain the trained presentation classification layer.

7. The method of claim 1, further comprising utilizing, by the at least one processor, the at least one multi-armed bandit problem to optimize the location within the interface rendering of the at least one presentation container based at least in part on a context of the rendering request.

8. The method of claim 7, wherein the context comprises at least one of:
   at least one prior rendering request,
   at least one location associated with the rendering request,
   at least one user data attribute of the user data associated with at least one state of the user profile, at least one rendering characteristic associated with the rendering request, or at least one time of day associated with the rendering request.

9. The method of claim 1, wherein the user data comprises a transaction history, and the at least one presentation item comprises at least one offer for a financial product associated with a financial entity.

10. A system comprising:
at least one processor in communication with at least one non-transitory computer readable medium having software instructions stored thereon, wherein the at least one processor, upon executing the software instructions, is configured to:
receive an interface rendering request from a user device associated with a user;
determine a user profile associated with the user device, wherein the user profile comprises user data representative of user online behavior of the user;
utilize a trained rendering type machine learning model to predict a rendering type from a plurality of candidate rendering types for displaying a user interface rendering to the user, based at least in part on the user data of the user profile;
wherein the trained rendering type machine learning model comprises at least one trained rendering type classification layer having trained rendering type classification parameters;
utilize a trained rendering template machine learning model to predict an interface rendering template from a plurality of candidate interface rendering templates for the user interface rendering based at least in part on:
a library of rendering templates,
the rendering type, and
the user data of the user profile;
wherein the trained rendering template machine learning model comprises at least one trained rendering template classification layer having trained rendering template classification parameters;
wherein the rendering template comprises at least one presentation container for displaying at least one presentation item;
wherein the trained rendering template machine learning model comprises at least one multi-armed bandit problem trained to optimize at least one location within the interface rendering of the at least one presentation container,
utilize a trained presentation machine learning model to predict the at least one presentation item from a plurality of candidate presentation items to display in the at least one presentation container of the rendering template based at least in part on:
the rendering type, and
the user data of the user profile;
wherein the trained presentation machine learning model comprises at least one trained presentation classification layer having trained presentation classification parameters:
generate the user interface rendering in response to the rendering request;
wherein the user interface rendering comprises the at least one presentation item configured to be positioned within the at least one container of the rendering template; and instruct the user device to render the user interface rendering on a display so as to display the at least one presentation item within the at least one container of the rendering template.

11. The system of claim 10, wherein the rendering request is associated with at least one software user interface (UI).

12. The system of claim 11, wherein the at least one software UI comprises at least one of:
a webpage rendering,
an application rendering, or
an operating system (OS) interface.

13. The system of claim 11, wherein the least one software UI comprises an interface component within at least one of:
a webpage rendering,
an application rendering, or
an operating system (OS) interface.

14. The system of claim 10, wherein the at least one processor, upon executing the software instructions, is further configured to:
receive at least one rendering metric indicating at least one measurement of user engagement with the at least one presentation item of the interface rendering;
generate exploit training data comprising:
the rendering type,
the rendering template,
the at least one presentation item, and
the at least one rendering metric;
train according to the exploit training data, the trained rendering type classification parameters of the rendering type machine learning model to refine the trained rendering type classification layer;
train according to the exploit training data, the rendering template classification parameters of the rendering template machine learning model to refine the trained rendering template classification layer; and
train according to the exploit training data, the presentation classification parameters of the presentation machine learning model to refine the trained presentation classification layer.

15. The system of claim 10, wherein the at least one processor, upon executing the software instructions, is further configured to:
generate a randomly generated interface rendering in response to a prior rendering request;
wherein the interface rendering comprises:
a randomly selected rendering type from the plurality of candidate rendering types,
a randomly selected rendering template from the plurality of candidate rendering templates, and
at least one randomly selected presentation item from the plurality of candidate presentation items;
generate the randomly generated interface rendering in response to the prior rendering request;
wherein the randomly generated interface rendering comprises the at least one randomly selected presentation item configured to be positioned according to the randomly selected rendering template; and
instruct the user device to render the randomly generated interface rendering on the display so as to display the at least one randomly selected presentation item;
receive at least one prior rendering metric indicating at least one measurement of user engagement with the at least one randomly selected presentation item of the randomly generated interface rendering;
generate explore training data comprising:
the randomly selected rendering type,
the randomly selected rendering template, the at least one randomly selected presentation item, and the at least one prior rendering metric;

train according to the explore training data, rendering type classification parameters of the rendering type machine learning model to obtain the trained rendering type classification layer;

train according to the explore training data, rendering template classification parameters of the rendering template machine learning model to obtain the trained rendering template classification layer; and train according to the explore training data, presentation classification parameters of the presentation machine learning model to obtain the trained presentation classification layer.

16. The system of claim 10, wherein the at least one processor, upon executing the software instructions, is further configured to utilize the at least one multi-armed bandit problem to optimize the location within the interface rendering of the at least one presentation container based at least in part on a context of the rendering request.

17. The system of claim 16, wherein the context comprises at least one of:
- at least one prior rendering request,
- at least one location associated with the rendering request,
- at least one user data attribute of the user data associated with at least one state of the user profile,
- at least one rendering characteristic associated with the rendering request, or
- at least one time of day associated with the rendering request.

18. The system of claim 10, wherein the user data comprises a transaction history, and the at least one presentation item comprises at least one offer for a financial product associated with a financial entity.

* * * * *